(12) United States Patent
Ogawa

(10) Patent No.: US 6,816,155 B1
(45) Date of Patent: Nov. 9, 2004

(54) METHOD OF CORRECTING GRADATION AND IMAGE DISPLAY SYSTEM EMPLOYING THE SAME

(75) Inventor: Eiji Ogawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/537,679

(22) Filed: Mar. 29, 2000

(30) Foreign Application Priority Data

Mar. 29, 1999 (JP) .......................................... 11-085755

(51) Int. Cl.⁷ ................................................. G09G 5/00
(52) U.S. Cl. ....................... 345/207; 345/204; 345/690; 345/589; 345/590; 345/601; 348/180; 348/189; 348/236; 348/254; 348/609; 358/521; 358/525
(58) Field of Search ................................ 345/207, 687, 345/690, 589–591, 596–597; 348/180, 189, 236, 254, 609; 382/274, 275, 300; 358/521, 525, 429, 455, 456, 457, 458

(56) References Cited

U.S. PATENT DOCUMENTS

| | | | | |
|---|---|---|---|---|
| 4,386,345 A | * | 5/1983 | Narveson et al. ............... 345/22 |
| 4,989,072 A | * | 1/1991 | Sato et al. .................... 324/404 |
| 5,115,229 A | * | 5/1992 | Shalit .......................... 324/404 |
| 5,600,574 A | * | 2/1997 | Reitan ........................ 702/185 |
| 5,657,082 A | * | 8/1997 | Harada et al. ............... 348/262 |
| 5,859,933 A | * | 1/1999 | Sasanuma et al. ........... 382/274 |
| 6,078,302 A | * | 6/2000 | Suzuki .......................... 345/77 |
| 6,081,254 A | * | 6/2000 | Tanaka et al. ............... 345/207 |
| 6,278,533 B1 | * | 8/2001 | Takemoto .................... 358/521 |
| 6,323,934 B1 | * | 11/2001 | Enomoto ...................... 355/32 |
| 6,327,708 B1 | * | 12/2001 | Monsees ...................... 725/12 |
| 6,337,675 B1 | * | 1/2002 | Toffolo et al. ................. 345/77 |

OTHER PUBLICATIONS

US 2002/0057470 A1 (Koide et al) US patent application publication, dated May 16, 2002.*

* cited by examiner

Primary Examiner—Henry N. Tran
(74) Attorney, Agent, or Firm—Sughrue Mion, PLLC

(57) ABSTRACT

The method of gradation correction of input image data to be displayed on an image display apparatus converts to logarithmic data first characteristic values which represent the display characteristics inherent in the image display apparatus and second characteristic values which represent the desired gradation to be eventually realized with the image display apparatus, respectively, and optionally interpolating both the logarithmic data, constructs a gradation correction table based on both the logarithmic data of the first characteristic values and the logarithmic data of the second characteristic values and performs gradation correction on the input image data to the image display apparatus using the gradation correction table. The image display system displays on the image display apparatus the thus corrected image data on which the gradation correction is performed by implementing the method. The method and system are capable of producing a smooth enough correction LUT (look-up table) to allow gradation correction to be performed in such a way that the image display apparatus will eventually provide the intended display characteristics. Therefore, the system can display a high quality image that has no defects such as artifacts.

23 Claims, 4 Drawing Sheets

METHOD OF CORRECTING GRADATION AND IMAGE DISPLAY SYSTEM EMPLOYING THE SAME

BACKGROUND OF THE INVENTION

This invention relates to a method of correcting gradation for use with image display apparatus such as a CRT (cathode-ray tube), an LCD (liquid-crystal display) and an LP (laser printer). The invention also relates to an image display system employing such method of gradation correction.

Image display apparatus such as CRT, LCD and LP are currently used in various fields and image display systems incorporating such image display apparatus are under development. Digital image display apparatus need gradation correction and in order to ensure that they eventually provide the intended display characteristics, a dedicated lookup table (LUT) is constructed for gradation correction. To construct it, the gradation characteristics inherent in each image display apparatus are examined and compared with the input of the desired (or aimed) gradation characteristics. An image is processed with the thus constructed LUT and presented on the image display apparatus of interest.

The inherent characteristics of image display apparatus such as CRT and LCD and film/light box (Schaukasten) systems typically adapted to display X-ray images are measured by luminance and the obtained luminance values are usually input to construct a LUT for gradation correction. If a curve representing the desired gradation that is aimed at a target (hereunder referred to as a "desired gradation curve") is defined in terms of the relationship between luminance and data value, both the inherent and desired characteristics are expressed by the relationship between luminance and data value and it is possible to construct a smooth correction LUT.

However, if a desired gradation curve is defined in terms of data which is not the luminance data such as the logarithm of luminance [log(brightness)] and data value, a smooth correction LUT is not obtained. In most cases, both the inherent characteristic curve which represents the inherent characteristics of a specific apparatus and the desired gradation curve are obtained by constructing continuous data through interpolation of discrete data of measurement. A problem with this approach is that given a small number of discrete points, simple linear interpolation does not suffice to assure smoothness for the desired gradation curve, inherent characteristic curve and correction LUT. If the correction LUT is not smooth enough, discontinuities occur in the gradation of a displayed image, producing artifacts in the image. This can be a serious problem in the medical field, in which high-quality images are particularly needed and artifacts are a potential cause of erroneous diagnoses.

SUMMARY OF THE INVENTION

The present invention has been accomplished under these circumstances and has as an object providing a method of gradation correction that is capable of producing a smooth enough correction LUT to allow gradation correction to be performed in such a way that an image display apparatus will eventually provide the intended display characteristics.

Another object of the invention is to provide an image display system employing this method of gradation correction and being capable of displaying an image of high quality that has no defects such as artifacts.

The first object of the present invention is attained by its first and second aspect. According to its first aspect, the present invention provides a method of gradation correction of input image data to be displayed on an image display apparatus, comprising the steps of acquiring first characteristic values which represent the display characteristics inherent in the image display apparatus, converting the first characteristic values to logarithmic data, acquiring as the logarithmic data second characteristic values which represent the desired gradation to be eventually realized with the image display apparatus, constructing a gradation correction table based on the logarithmic data of the first characteristic values and the logarithmic data of the second characteristic values that have been converted logarithmically, and performing gradation correction on the input image data to the image display apparatus using the gradation correction table.

In the first aspect of the invention, the logarithmic data of the second characteristic values are preferably acquired by inputting directly the logarithmic data of the second characteristic data or by inputting the second characteristic data and then converting the second characteristic data to the logarithmic data.

According to its second aspect, the present invention provides a method of gradation correction further comprising the step of interpolating the logarithmic data of the first characteristic values and the logarithmic data of the second characteristic values that have been converted logarithmically in the first aspect of the prevent invention, wherein the gradation correction table is constructed based on the logarithmic data of the first characteristic values and the logarithmic data of the second characteristic values.

In both the first and second aspects of the invention, the interpolation is preferably selectable from between high-order interpolation and linear interpolation.

It is also preferred that the interpolation is adapted to be switched between high-order interpolation and linear interpolation and vice versa depending upon a number of discrete points to be interpolated.

The second object of the present invention can be attained by its third and fourth aspects. According to its third aspect, the present invention provides an image display system, comprising an image display apparatus on which displays input image data, a first characteristic value acquiring device which acquires first characteristic values which represent display characteristics inherent in the image display apparatus, a first logarithmic conversion device which converts the first characteristic values to logarithmic data, a logarithmic data acquiring device which acquires logarithmic data of second characteristic values which represent the desired gradation to be eventually realized with the display apparatus, a gradation correction table constructing device by which a gradation correction table is constructed based on the respective logarithmic data of the first characteristic values and the second characteristic values that have been converted logarithmically, and a gradation correction device which performs gradation correction on the input image data using the gradation correction table wherein the corrected input image data on which the gradation correction is performed by the gradation correction device is displayed on the image display apparatus.

In the third aspect of the invention, the logarithmic data acquiring device is a direct input device which inputs directly the logarithmic data of the second characteristic values.

It is also preferred that the logarithmic data acquiring device comprises an input device which inputs the second characteristic values and a second logarithmic conversion device which converts the second characteristic values to the logarithmic data.

It is further preferred that the first and second logarithmic conversion devices are one logarithmic conversion device.

It is yet further preferred that the first characteristic value acquiring device is a luminance meter with which a transmitted light from the image display apparatus is measured and that provides luminance data for obtaining the first characteristic values.

According to its fourth aspect, the present invention provides an image display system further comprising an interpolation device for interpolating the respective logarithmic data of the first characteristic values and the second characteristic values, respectively, wherein the gradation correction table constructing device constructs the gradation correction table based on the respective logarithmic data of the first characteristic values and the second characteristics values that have been interpolated, respectively.

In both the third and fourth aspects of the invention, it is preferable that the interpolation device can select the interpolation between high-order interpolation and linear interpolation.

It is also preferably that the interpolation device adapts to switch the interpolation between high-order interpolation and linear interpolation depending upon a number of discrete points to be interpolated.

DETAILED DESCRIPTION OF THE INVENTION

The method of gradation correction according to the first and second aspects of the invention and the image display system according to its third and fourth aspects are described below in detail with reference to the preferred embodiments shown in the accompanying drawings.

Figure 1:
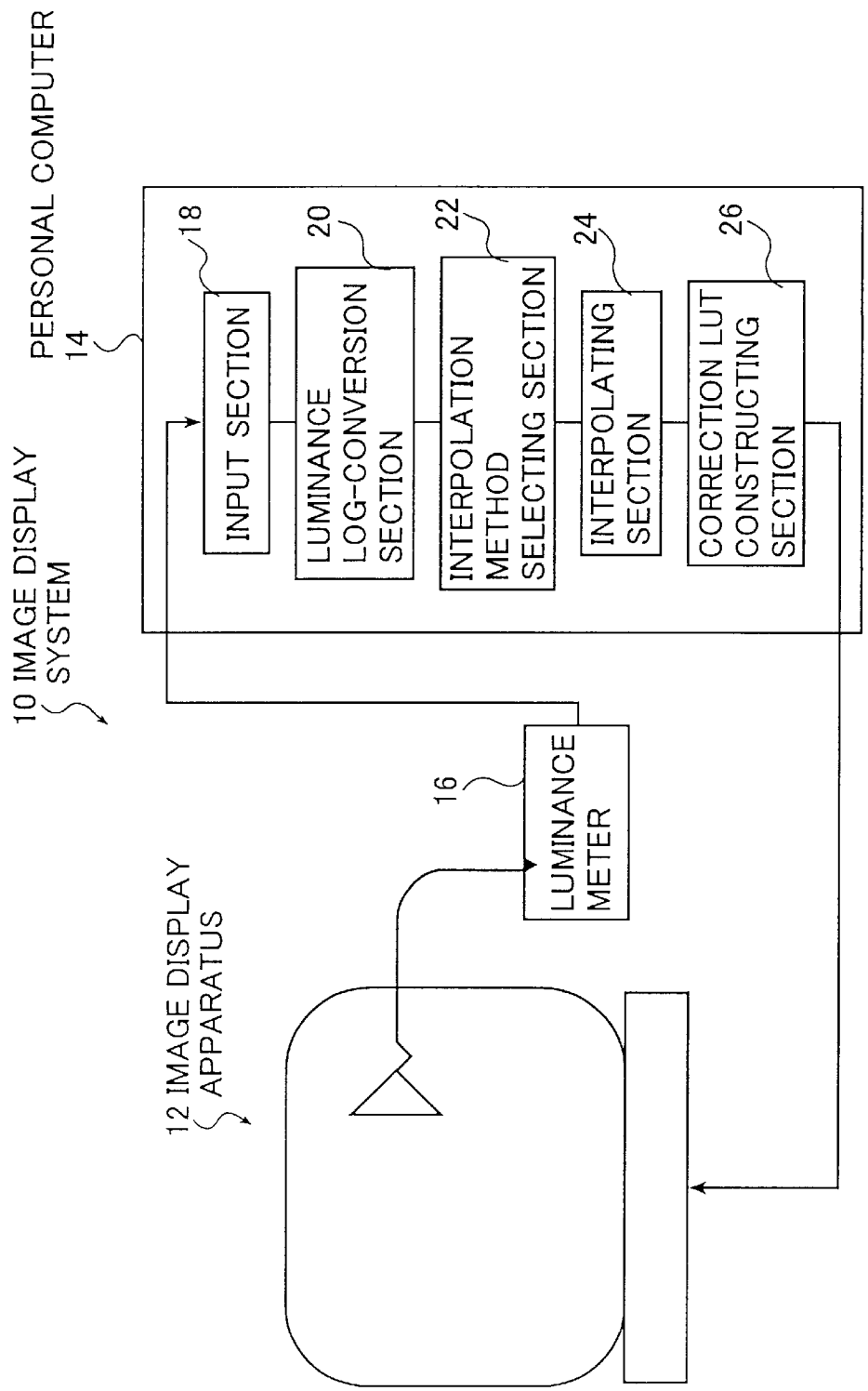
FIG. 1 is a block diagram showing schematically an image display system according to the first embodiment of the invention.

FIG. 1 is a block diagram showing schematically an image display system according to the first embodiment of the invention. The image display system performs gradation correction by the method according to the first and second aspects of the invention and displays the corrected image.

Referring to FIG. 1, the image display system generally indicated by 10 has an image display apparatus 12 and a personal computer 14 as two basic components. The image display system 10 also has a luminance meter 16 that provides luminance data to be entered from the display screen of the image display apparatus 12. The personal computer 14 has an input section 18, a luminance log-conversion section 20, an interpolation method selecting section 22, an interpolating section 24, and a correction LUT constructing section 26. The luminance data that has been entered from the image display apparatus 12 by means of the luminance meter 16 is sent to the input section 18 of the personal computer 14.

We now describe the method of constructing a correction LUT. The method starts with measuring the inherent display characteristics of the image display apparatus 12 to compute its characteristic curve. To this end, a predetermined test pattern is presented on the display apparatus 12 and the relationship between the data of measurement and the luminance values is measured with the luminance meter 16. The test pattern is a flat pattern of same data for all regions of measurement and is used to measure the ability of the system to display images of a gray scale. A correction LUT is used to present a test pattern on the image display apparatus 12 for measuring its inherent display characteristics and linear conversion is performed by this LUT. In other words, the relationship between input digital image signal $QL_{in}$ and output digital image signal $QL_{out}$ is expressed by $QL_{in} = QL_{out}$.

In the next step, measurements are conducted at the required number of points. If the digital image data to be entered consists of 10 bits, input can be made at 1024 points. In the case of a CRT, the voltage ranging, for example, from zero volts at the darkest level to 0.512 volts at the brightest level may be divided into 17 or 33 steps so that data inputting is made in terms of the number of steps.

In the case of a film/light box system, a test pattern film printed with the aid of a correction LUT of the same linear type as described above is placed on the light box and the transmitted light is measured with the luminance meter 16.

In either case, the values of measurement with the luminance meter 16 are fed into the input section 18 of the personal computer 14.

In the next step, the desired gradation characteristics are entered by, for example, touching a keyboard or other input device connected to the personal computer 14. In this step, the overall gradation to be ultimately obtained is set and any sampling points may be entered or, alternatively, standard settings of points may be entered. The inputting of the desired gradation characteristics may be made in terms of luminance values or the logarithm of luminance as expressed by log (luminance).

In the next step, the thus entered characteristic values of the image display apparatus 12 and the desired settings of gradation characteristics also entered into the personal computer 14 are converted to logarithmic values in the luminance log-conversion section 20. If the desired settings of gradation characteristics have already been entered in terms of log (luminance), they need not be converted to logarithmic values. In preparation for the subsequent step of interpolation, the converted data values are arranged such that they can be expressed as a monotonic decreasing function.

Since the converted values are discrete data, they must be interpolated in the next step to produce continuous data. A suitable method of interpolation is selected in the interpolation method selecting section 22. There are three choices of method and they are second-order interpolation and third-order interpolation belonging high-order interpolation and linear interpolation. A suitable method of interpolation can be selected from the input section 18. If no suitable method of interpolation is selected from the input section 18, the number of discrete points is checked in the interpolation method selecting section 22 and if it is less than a threshold (say, 50 points), second-order interpolation may be adopted; otherwise, linear interpolation may be used.

In the interpolating section 24, those values of data which have been changed to brightness values by taking the logarithm of measured or set luminance values are sampled and then interpolated. If the data in the correction LUT consist of 8 bits, the interpolated data should each consist of at least 8 bits.

Figure 2A:
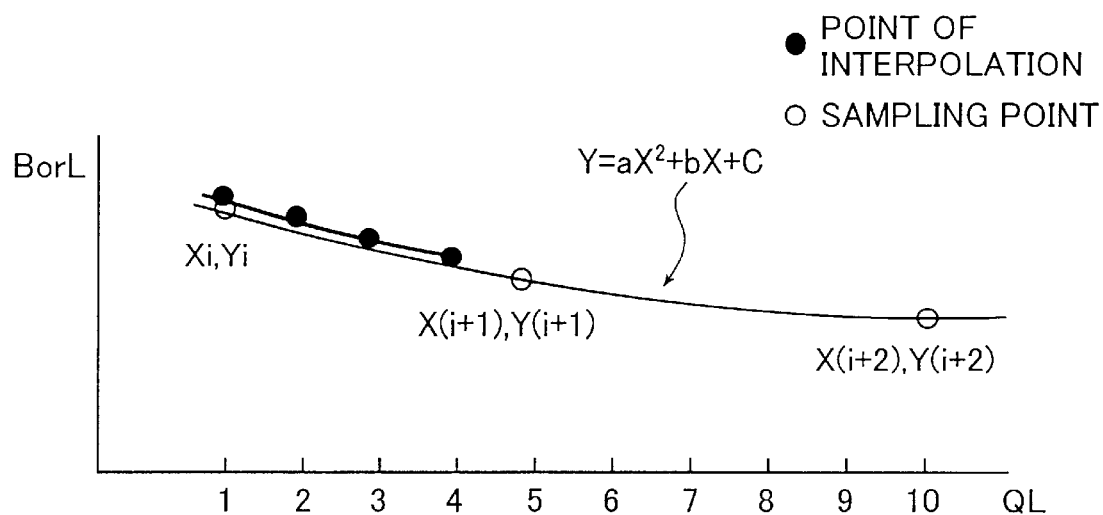
FIG. 2A illustrates how second-order interpolation is performed.

We now describe the method of second-order interpolation with reference to FIG. 2A. Two sampling points $(X_i, Y_i)$ and $(X_{i+1}, Y_{i+1})$ are interpolated by a quadratic curve $Y=aX^2+bX+c$ which passes through three sampling points $(X_i, Y_1)$, $(X_{i+1}, Y_{i+1})$ and $(X_{i+2}, Y_{i+2})$. Interpolation starts from $(X_i, Y_i)$ and ends at $(X_{i+1}-1, Y_{i+1}-1)$, requiring $X_{i+1}-X_i$ points to be interpolated.

Figure 2B:
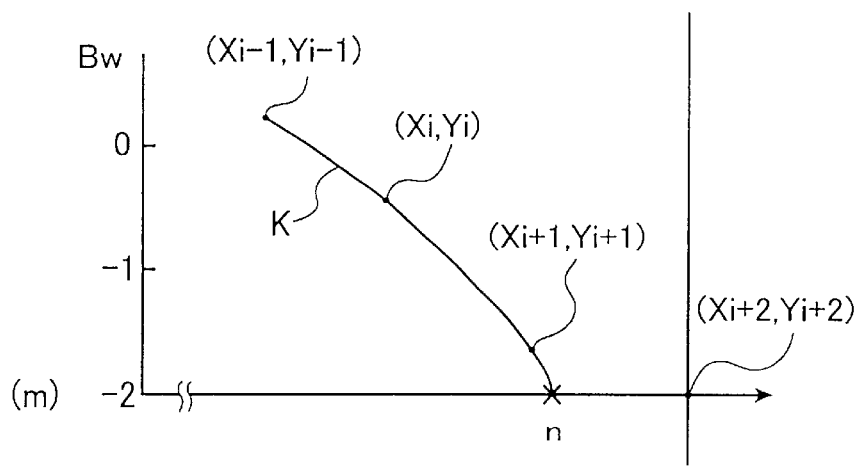
FIG. 2B illustrates how end points are treated in the second-order interpolation shown in FIG. 2A.

If, as FIG. 2B shows, $(X_{i+2}, Y_{i+2})$ is equal to m, or the logarithm of a luminance value at the measurable limit that can be entered externally, a quadratic curve K passing through $(X_{i-1}, Y_{i-1})$, $(X_i, Y_i)$ and $(X_{i+1}, Y_{i+1})$ is used to make interpolation of the range from $(X_i, Y_i)$ through $(X_{i+1}, Y_{i+1})$ to (n,m) which represents the point of intersection between the quadratic curve K and Y=m. Between (n,m) and (1023, m), interpolation is effected by Y=m. If the luminance value at the measurable limit is 0.01, m is −2 (=log0.01). In other words, the value of default is −2.

Figure 3:
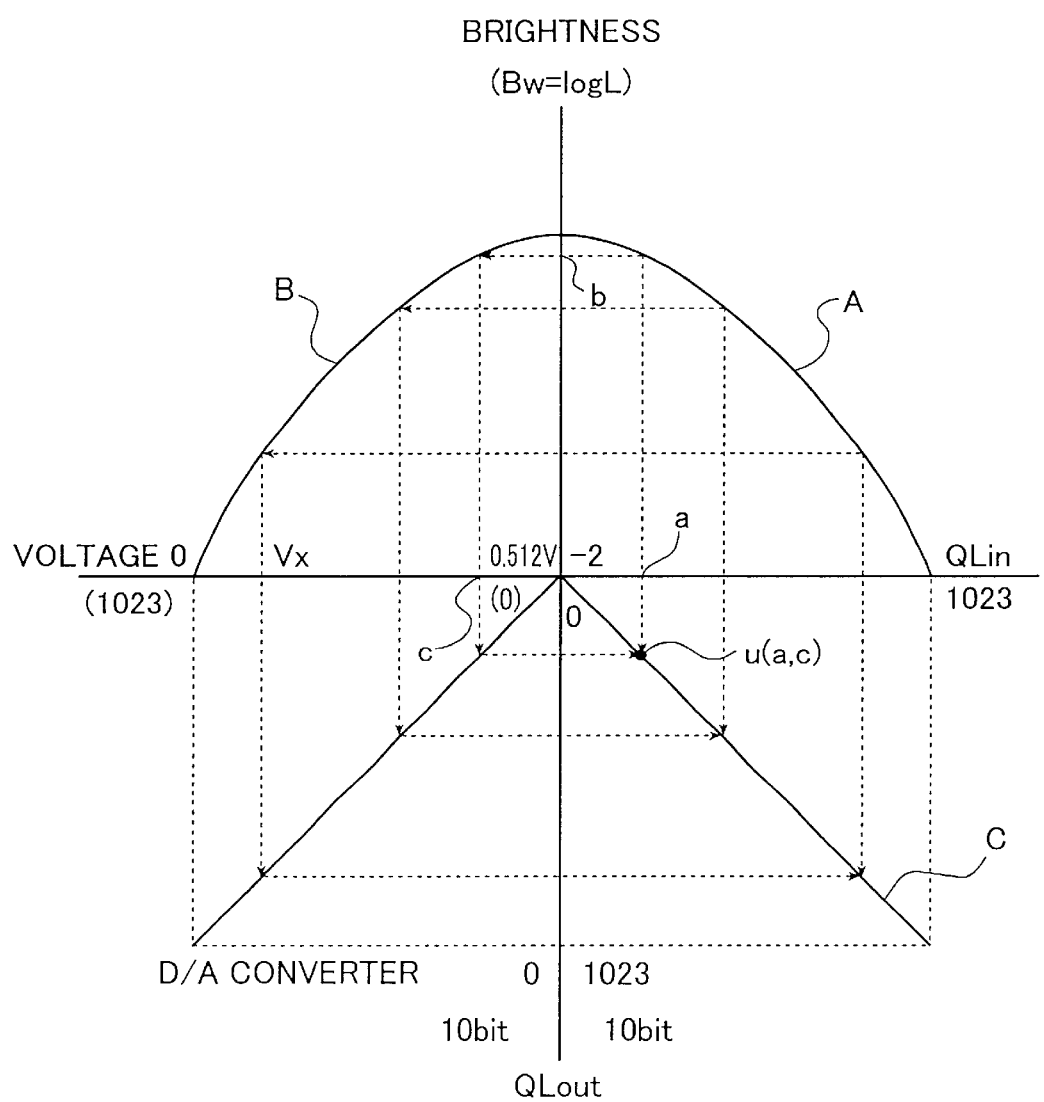
FIG. 3 illustrates how a correction LUT used in the invention is constructed.

In this way, the desired settings of gradation characteristics are interpolated to construct the desired gradation curve and the inherent characteristic values are similarly interpolated to construct the inherent characteristic curve. FIG. 3 is a four-quadrant graph showing the desired gradation curve and the inherent characteristic curve. The desired gradation curve is indicated by A in the first quadrant of FIG. 3, with the horizontal axis plotting the values of digital image data and the vertical axis plotting the brightness value $B_w$=logL. The inherent characteristic curve is indicated by B in the second quadrant of FIG. 3, with the horizontal axis plotting voltage and the vertical axis plotting brightness value.

Subsequently, in the correction LUT constructing section 26, a correction LUT is constructed by referring to the desired gradation curve A and the inherent characteristic curve B. To be more specific, given value a of the digital input image data $QL_{in}$, the corresponding brightness value b is determined from the desired gradation curve A. Then, given the brightness value b, the corresponding voltage c is determined from the inherent characteristic curve B. The voltage is associated with the value of luminance it presents on the display apparatus. The voltage c is translated to a corresponding point in the third quadrant of FIG. 3 on a straight line that represents the characteristics of D/A conversion and then translated to a point u(a,c) in the fourth quadrant. A plurality of this point u(a,c) construct a curve c which provides a correction LUT.

The thus constructed correction LUT is installed in the gradation correcting section of the image display apparatus 12. The installment may be accomplished either direct by loading through a communication line or indirect via a floppy disk.

Using the installed correction LUT, the image display apparatus 12 performs gradation transformation of the image data and displays the corrected image.

In the foregoing embodiment, both the desired gradation and the inherent characteristics of the display apparatus are converted to logarithms and the resulting brightness values are interpolated to construct a correction LUT which is smooth enough for the intended purposes of the invention. If the discrete data to be interpolated are scarce, second-order interpolation is performed to ensure the construction of a smooth correction LUT.

By performing gradation correction using the smooth correction LUT, an appropriate image having no artifacts or other defects can be produced that has sufficient quality to meet the rigorous requirements of the medical field.

Figure 4B:
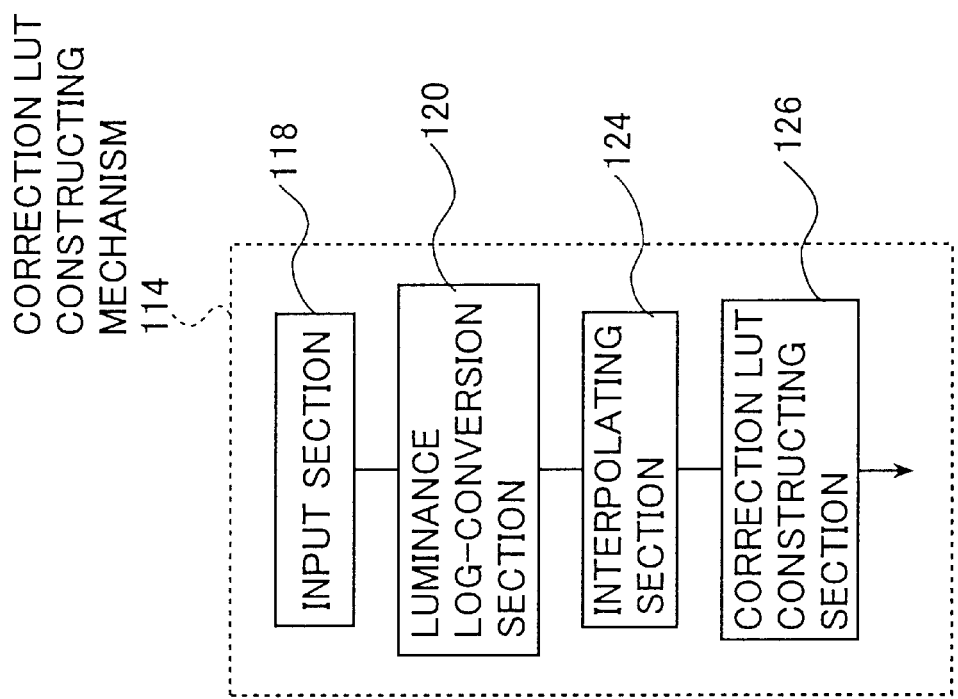
FIG. 4B is a block diagram showing schematically the mechanism of constructing a correction LUT in the image display system shown in FIG. 4A.
Figure 4A:
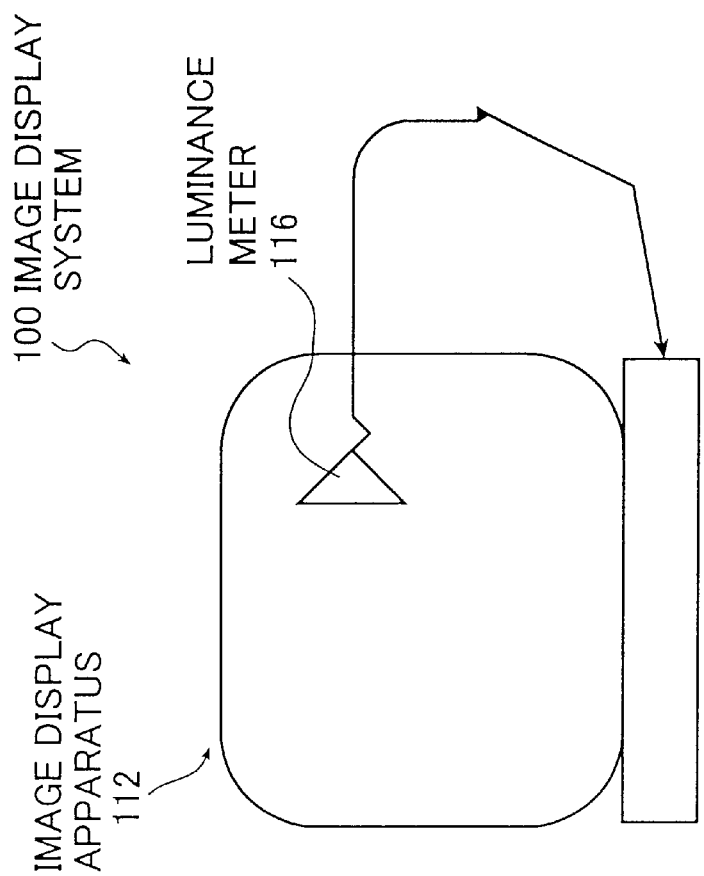
FIG. 4A is a block diagram showing schematically an image display system according to the second embodiment of the invention.

We now describe the second embodiment of the invention, in which the image display apparatus has the ability to construct a correction LUT on its own. FIG. 4A shows an image display system according to the second embodiment which is generally indicated by 100. The image display system 100 has a correction LUT constructing mechanism 114 included in the image display apparatus 112 as shown in FIG. 4B.

The display screen of the apparatus 112 is subjected to measurement with a luminance meter 116 and the measured data is sent to an input section 118 of the correction LUT constructing mechanism 114. The correction LUT constructing mechanism 114 has the input section 118, a luminance log-conversion section 120, an interpolating section 124 and a correction LUT constructing section 126. These sections perform the same functions as in the first embodiment to construct a correction LUT.

In the image display system 100 according to the second embodiment of the invention, the values of measurement with the luminance meter 116 from the display screen of the apparatus 112 are fed back to the same apparatus 112 so that the luminance values of the display on a test pattern are stored automatically.

In addition, the desired gradation whose settings have been entered from an especially provided keyboard or input device is referenced to construct a correction LUT automatically.

In this second embodiment, one can construct as smooth a correction LUT as has been obtained in the first embodiment and it is possible to produce a displayed image that meets the high quality requirements of the medical field.

While the present invention has been described above in detail with reference to the method of gradation correction and the image display system which employs it, one should clearly understand that the foregoing are not the sole examples of the invention and various improvements and modifications can be made without departing from the scope and spirit of the invention.

As described on the foregoing pages, the digital image data to be subjected to gradation correction in the method of the invention are first converted to logarithmic values before interpolation and this enables the construction of a smooth correction LUT that realizes the desired gradation which has been set in terms of the logarithms of measured luminance values.

If the discrete data to be interpolated are scarce, high-order interpolation such as second-order interpolation and third order interpolation is performed to construct a smooth correction LUT.

In either case, a smooth correction LUT is constructed. By using this LUT in the gradation correction of the input image data, one can produce a displayed image of high quality that has no defects such as artifacts.

What is claimed is:

1. A method of gradation correction of input image data to be displayed on an image display apparatus, comprising the steps of:

acquiring first characteristic values which represent the display characteristics inherent in the image display apparatus;

converting the first characteristic values to logarithmic data;

acquiring as the logarithmic data second characteristic values which represent the desired gradation to be eventually realized with the image display apparatus;

constructing a gradation correction table based on the logarithmic data of said first characteristic values and the logarithmic data of said second characteristic values that have been converted logarithmically; and performing gradation correction on the input image data to the image display apparatus using said gradation correction table.

2. The method according to claim 1, wherein said logarithmic data of the second characteristic values are acquired by inputting directly the logarithmic data of the second characteristic data or by inputting the second characteristic data and then converting the second characteristic data to the logarithmic data.

3. A method of gradation correction according to claim 1, further comprising the step of:

interpolating said logarithmic data of said first characteristic values and said logarithmic data of said second characteristic values that have been converted logarithmically;

wherein said gradation correction table is constructed based on said logarithmic data of said first characteristic values and said logarithmic data of said second characteristics values.

4. The method according to claim 3, wherein said interpolation is selectable from between high-order interpolation and linear interpolation.

5. The method of claim 4, wherein the higher order interpolation comprises a quadratic interpolation.

6. The method according to claim 3, wherein said interpolation is adapted to be switched between high-order interpolation and linear interpolation depending upon a number of discrete points to be interpolated.

7. The method of claim 1, wherein the first characteristic value corresponds to luminance of the display.

8. The method of claim 7, further comprising interpolating said logarithmic data of said first characteristic value and said logarithmic data of said second characteristic values that have been converted logarithmically, wherein said gradation correction table is constructed based on said logarithmic data of said first characteristic values and said logarithmic data of said second characteristic values.

9. The method of claim 8, wherein the higher order interpolation comprises a quadratic interpolation.

10. The method according to claim 1, wherein said input image data is data for displaying a predetermined test pattern, said predetermined test pattern is displayed on a display screen of said image display apparatus, transmitted light from said display screen in accordance with said predetermined test pattern displayed on said display screen is measured, output luminance data corresponding to said input image data is obtained, and said first characteristic values are acquired from said obtained output luminance.

11. An image display system, comprising:

an image display apparatus on which displays input image data;

a first characteristic value acquiring device which acquires first characteristic values which represent display characteristics inherent in said image display apparatus;

a first logarithmic conversion device which converts the first characteristic values to logarithmic data;

a logarithmic data acquiring device which acquires logarithmic data of second characteristic values which represent the desired gradation to be eventually realized with said display apparatus;

a gradation correction table constructing device by which a gradation correction table is constructed based on said respective logarithmic data of said first characteristic values and said second characteristic values that have been converted logarithmically; and a gradation correction device which performs gradation correction on said input image data using said gradation correction table;

wherein the corrected input image data on which said gradation correction is performed by said gradation correction device is displayed on said image display apparatus.

12. An image display system according to claim 11, further comprising:

an interpolation device for interpolating said respective logarithmic data of said first characteristic values and said second characteristic values, respectively;

wherein said gradation correction table constructing device constructs said gradation correction table based on said respectively logarithmic data of said first characteristic values and said second characteristic values that have been interpolated, respectively.

13. The system according to claim 12, wherein said interpolation device adapts to switch the interpolation between high-order interpolation and linear interpolation depending upon a number of discrete points to be interpolated.

14. The system according to claim 12, wherein said interpolation device can select the interpolation between high-order interpolation and linear interpolation.

15. The system of claim 14, wherein the higher order interpolation comprises a quadratic interpolation.

16. The system according to claim 11, wherein said logarithmic data acquiring device is a direct input device which inputs directly the logarithmic data of the second characteristic values.

17. The system according to claim 11, wherein said logarithmic data acquiring device comprises an input device which inputs the second characteristic values and a second logarithmic conversion device which converts the second characteristic values to the logarithmic data.

18. The system according to claim 17, wherein said first and second logarithmic conversion devices are one logarithmic conversion device.

19. The system according to claim 11, wherein said first characteristic value acquiring device is a luminance meter with which a transmitted light from said image display apparatus is measured and that provides luminance data for obtaining the first characteristic values.

20. The system of claim 19, further comprising:

an interpolation device for interpolating said respective logarithmic data of said first characteristic values and said second characteristic values, wherein said gradation correction table constructing device constructs said gradation correction table based on said respective logarithmic data of said first characteristic values and said second characteristic values that have been interpolated.

21. The system of claim 20, wherein the interpolation device selectively sets interpolation between higher order interpolation and linear interpolation.

22. The system according to claim 19, wherein said input image data is data for displaying a predetermined test pattern and said predetermined test pattern is displayed on a display screen of said image display apparatus, and wherein said luminance meter measures transmitted light from said display screen in accordance with said predetermined test pattern displayed on said display screen, obtains output luminance data corresponding to said input image data and acquires said first characteristic values from said obtained output luminance data.

23. The system according to claim 11, wherein said input image data is data for displaying a predetermined test pattern and said predetermined test pattern is displayed on a display screen of said image display apparatus, and wherein said first characteristic value acquiring device measures transmitted light from said display screen in accordance with said predetermined test pattern displayed on said display screen, obtains output luminance data corresponding to said input image data and acquires said first characteristic values from said obtained output luminance data.

\* \* \* \* \*